United States Patent

[11] 3,527,176

| [72] | Inventor | William M. Losapio<br>181 Frederick St., Yonkers, New York 10703 |
|---|---|---|
| [21] | Appl. No. | 753,427 |
| [22] | Filed | Aug. 19, 1968 |
| [45] | Patented | Sept. 8, 1970 |

[54] SAFE FOR USE IN CONJUNCTION WITH A VEHICLE
7 Claims, 4 Drawing Figs.

[52] U.S. Cl. ............................................ 109/57, 232/15
[51] Int. Cl. ............................................. E05g 1/00
[50] Field of Search .................................. 109/57–59, 50; 232/15, 43.2; 296/37, 72; 312/270; 220/17

[56] References Cited
UNITED STATES PATENTS

| 3,016,185 | 1/1962 | Osborne .................... | 232/15 |
| 3,083,896 | 4/1963 | Cairelli et al. ............ | 232/15 |
| 3,108,741 | 10/1963 | Thomas ..................... | 232/15X |
| 2,798,445 | 7/1957 | Gehman ..................... | 109/50 |

*Primary Examiner*—J. Karl Bell
*Attorney*—Curtis, Morris and Safford

ABSTRACT: A safe for use in conjunction with a vehicle, such as a taxicab, wherein a first open box is secured to the frame of the vehicle and a second open box of a larger size is provided to nest over the first box, with a locking mechanism mounted on the outer box to lock the two boxes together. A slot is provided in the second box to allow the driver of the vehicle to deposit money in the safe while he is working.

Patented Sept. 8, 1970

INVENTOR.
WILLIAM M. LOSAPIO

BY

Curtis, Morris & Safford

ATTORNEYS

INVENTOR.
WILLIAM M. LOSAPIO

SAFE FOR USE IN CONJUNCTION WITH A VEHICLE

This invention pertains to safes and more in particular to safes for use in conjunction with a vehicle wherein the driver of the vehicle can deposit money in the safe thereby preventing theft of the money while he is working.

Drivers of vehicles such as taxicabs, delivery trucks for bakeries, dairies and the like, and other vehicles where the driver collects money while operating the vehicle are vulnerable to holdup men. The driver's exposed position as sole custodian of money received while he is in the vehicle makes him an easy prey for would-be holdup men. Taxicab operators are particularly susceptible to robbery attempts and in many cities today the incidence of taxicab holdups have risen to alarming proportions. The problem is aggravated by the fact that it is common knowledge that these drivers are usually unprotected, can be ordered to drive a passenger to a secluded area and that the drivers often have appreciable amounts of cash on their person. Thus would-be robbers know that it is relatively easy to intimidate taxicab drivers and force them to surrender their money.

It is therefore an object of the present invention to provide a tamper-proof safe for use in conjunction with a vehicle wherein the driver can safely deposit money therein to prevent its theft and the safe cannot be removed easily from the vehicle.

It is a further object of the present invention to provide a convenient storage receptacle for money and valuables in a vehicle, and to provide a suitable warning on the vehicle indicating this fact to dissuade would-be holdup men.

It is a still further object to provide a feasible arrangement for securing money and valuables in a vehicle while the vehicle is working.

A still further object of the present invention is to provide a safe which can be securely mounted to the frame of a vehicle to prevent its ready removal therefrom, with provision for the operator of the vehicle easily to deposit money therein.

In a preferred embodiment of the present invention an open-ended box is securely fastened to the frame of a vehicle and a second open-ended box is provided to nest securely over the first box. A locking mechanism on the second box is operable to securely lock the boxes together, and a suitable slot in the second box enables the driver of the vehicle to deposit money therein. A key to unlock the safe is retained at the vehicle depot so that the safe cannot be unlocked while the driver is on the road with the vehicle. A suitable warning is inscribed on the side of the vehicle attesting to the fact that the driver has only a limited amount of cash on his person to dissuade robbers from attempting to holdup the driver.

A more complete appreciation of the invention and many of its attendant advantages will be readily apparent as the same becomes better understood by reference to the following detailed description when considered in conjunction with the accompanying drawings wherein.

Figure 1:
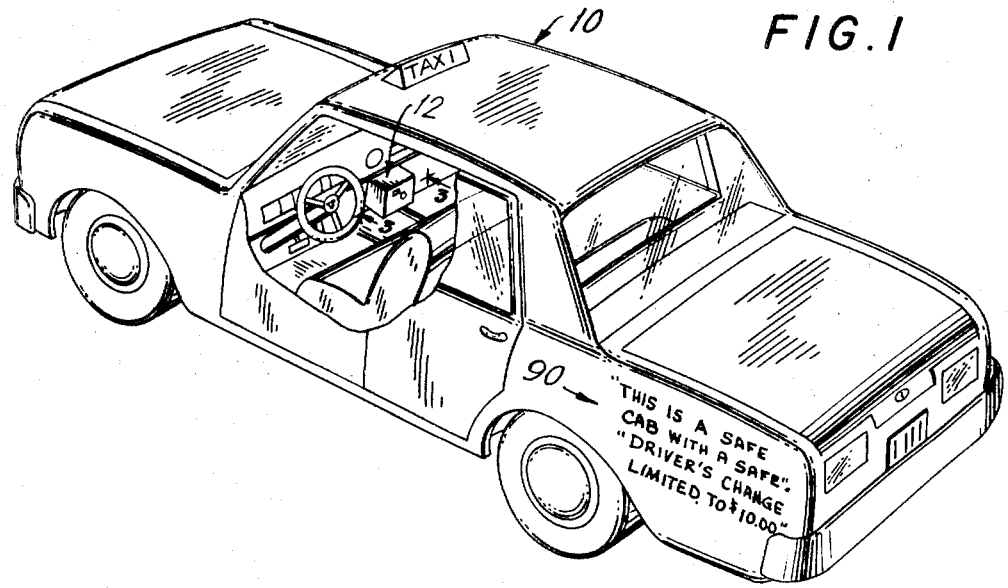
FIG. 1 is a perspective view, with parts broken away, showing the safe of the present invention mounted in a vehicle.
Figure 2:
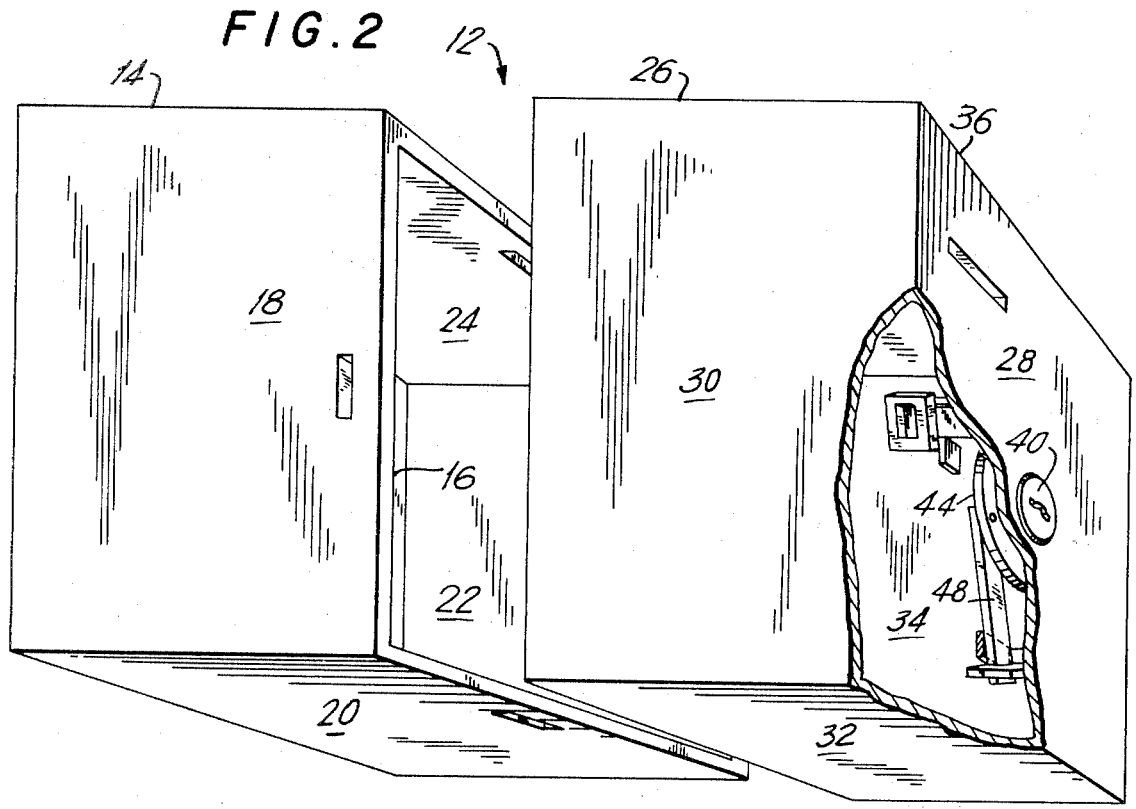
FIG. 2 is an exploded perspective view, partly broken away, showing the safe.

With reference to FIG. 1, a vehicle such as a taxicab 10 is provided with a safe 12 which is affixed to the frame of the vehicle, for example by welding or by mounting on heavy steel brackets (not shown) which are in turn welded to the vehicle frame. As shown in FIG. 2, the safe 12 includes an inner receptacle or box 14 of heavy gage steel, having a bottom portion 16 and side portions 18, 20, 22 and 24, respectively, which inner receptacle is firmly affixed to the vehicle frame. An outer receptacle or box 26, similarly of heavy gage steel, having a closed top portion 28 and side portions 30, 32, 34 and 36, respectively, is constructed so that it nests over the box portion 14 and completely overlies the inner box 14 so that when the two boxes are nested together the open face of box 26 is flush against the surface on which the safe is mounted so that a tool cannot be inserted between the box 26 and the mounting surface to pry the box off.

Figure 3:
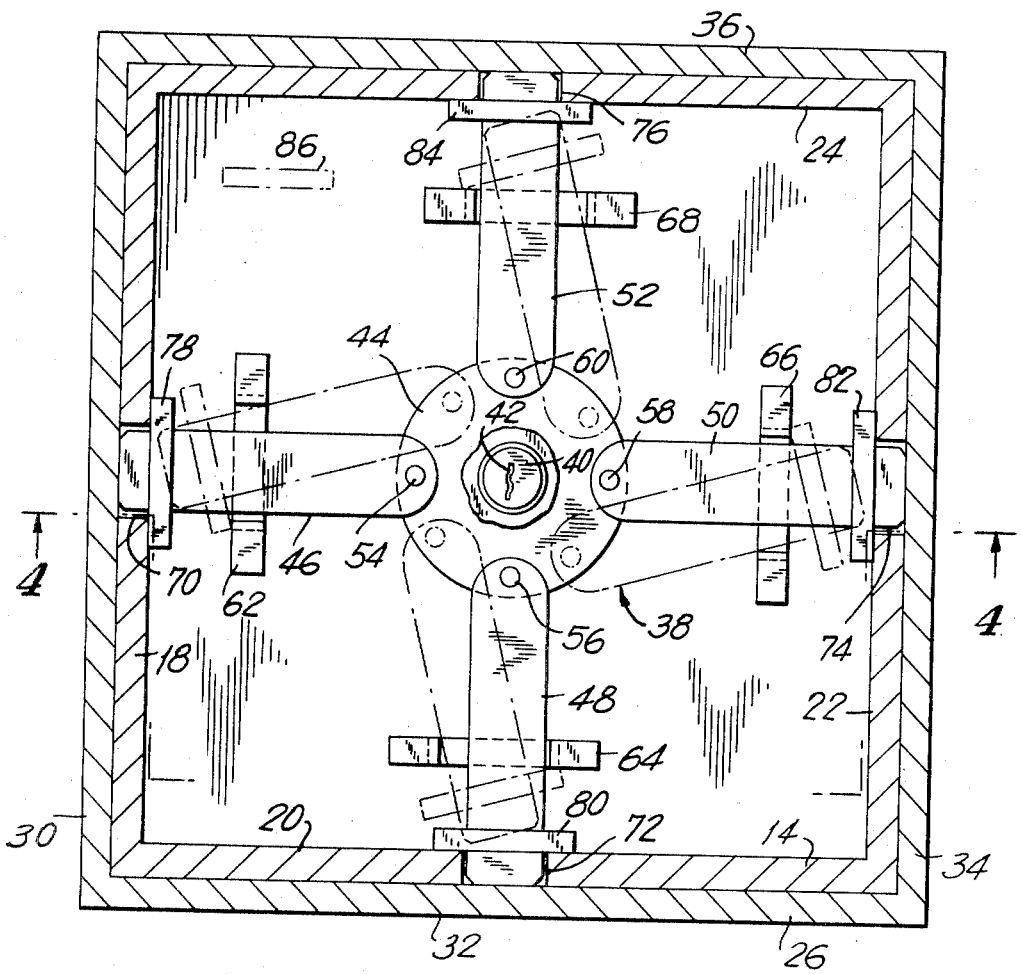
FIG. 3 is a sectional view taken on line 3—3 of FIG. 1 showing the locking mechanism for the safe.
Figure 4:
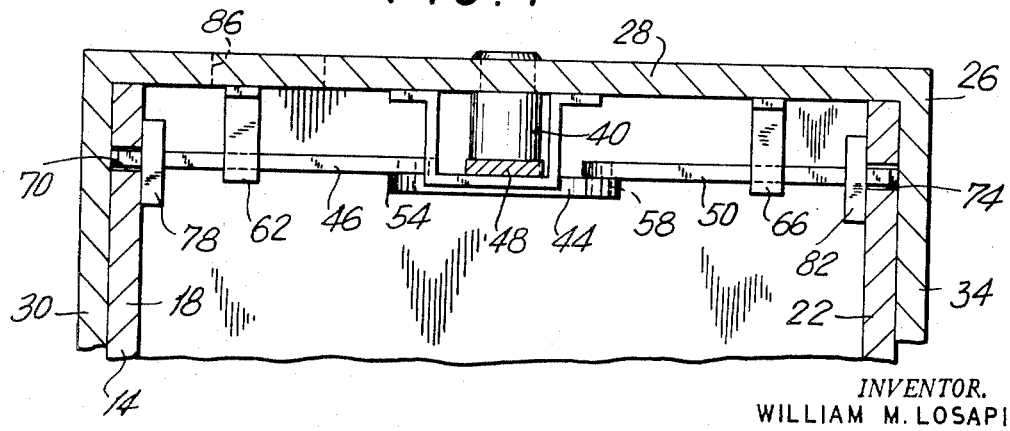
FIG. 4 is a view taken on line 4—4 of FIG. 3 showing the nesting relationship of the safe.

A locking mechanism 38 (see FIG. 3) is mounted to the top portion 28 of outer box 26 and includes a key-operated lock member 40, with the key slot 42 being accessible from outside the box. Lock member 40 controls a toggle plate 44 operably mounted on the lower end of the lock member so that toggle plate 44 rotates when lock 40 is turned by its key. Locking bars 46, 48, 50 and 52, respectively, extend radially from the toggle plate 44 and are mounted thereon by means of pivoting connecting members 54, 56, 58 and 60, respectively. Each of the bars 46—52 are supported for sliding movement in U-shaped brackets 62, 64, 66 and 68, respectively, which are mounted on the underside of top portion 28. When the bars are in locking position (shown in full line in FIG. 3) the tip of each bar 46—52 extends into a slotted opening 70, 72, 74 and 76 in side portions 18, 20, 22 and 24, respectively, of the box 14. Each locking bar 46—52 is provided with a shoulder portion 78, 80, 82 and 84, respectively, which limits the radial movement of the locking bars into the respective slots. The top portion 28 of the outer box 26 is also provided with a slot 86 to allow for the insertion of money or valuables into the safe.

When the two box portions 14 and 26 are nested together, the locking mechanism 38 is completely enclosed by the outer box 26 with no portion exposed except the key slot 42. Thus, the locking mechanism is protected from outside tampering making forcible entry into the safe to remove its contents extremely difficult.

In operation, the inner box 14 is rigidly secured to the frame of vehicle 10 in any appropriate manner and the outer box portion 26 is then slid over the inner box portion 14 until it nests securely thereon. A key is inserted in the key slot 42 to operate lock 40 and as the lock portion 40 rotates, it rotates the toggle plate 44 to cause the extending locking arms 46—52 to move radially outward in their support brackets 62—68 until the ends of the locking bars extend into the slots 70—76 on the inner box portion 14. The two nesting boxes are now securely held together and the assembled safe is securely mounted in the vehicle. The key is retained at the vehicle depot so that, while the vehicle is on the road, the operator is unable to open the safe and any money he receives during vehicle operation is deposited through slot 86 into the safe.

In order to make the safe an effective deterrent to holdup men and robbers, it is best if the vehicle in which the safe is incorporated has some indication on the vehicle that it is provided with a safe. For this purpose, a legend such as that shown at 90 (see FIG. 1) attesting to the fact that the taxicab has a safe and that the driver's change is limited to, for example ten dollars, will adequately forewarn would-be robbers that an attempt to holdup the driver of the vehicle would limit their bounty to ten dollars and, thus, would not be worth the effort or the resultant penalty, if they were caught. In order to allow the driver to make change for a large bill, the driver is provided with a suitable monetary exchange device, such as script.

It is thus seen that the present invention provides an economical method for protecting money receipts in the hands of a driver of a vehicle while the vehicle is on the road. The fact that the vehicle is equipped with a safe is advertised on the vehicle and acts as a deterrent to would-be holdup men and thus affords a degree of added protection for the driver.

While there has been described what is at present considered to be the preferred embodiment of this invention it will be obvious to those skilled in the art that various changes and modifications may be made therein without departing from the invention and it is, therefore, aimed to cover all such changes and modifications as fall within the true spirit and scope of the invention.

I claim:

1. A safe for use in conjunction with a vehicle comprising:
   a first receptacle having at least one open side;

said first receptacle being adapted to be rigidly secured to a frame member of said vehicle;

a second receptacle having at least one open side and dimensioned to be nestable with said first receptacle wherein said first and second receptacles, when in nesting relationship, form a closed safe;

said first and second receptacle being so dimensioned that when said receptacles are nested in said vehicle the overlying one of said receptacles closely abuts said frame member thereby precluding the insertion of an implement between the frame member and said receptacle to prevent unauthorized removal of said receptacle from said vehicle;

said safe including a locking mechanism to retain said first and second receptacles in nesting relationship; and means in said safe for inserting money therein while said receptacles are in nesting relationship within said vehicle.

2. The safe as defined in claim 1 wherein:

said first and second receptacles comprise box-like members each having four side panels and one end panel; and said locking mechanism being mounted on the end panel of said second receptacle and operable to engage a portion of said first receptacle thereby to secure said first and second receptacles together.

3. The safe as defined in claim 2 wherein:

said locking mechanism comprises a lock element mounted on said second receptacle end panel;

said lock member being operably connected to a toggle plate;

at least one locking bar pivotally connected to said toggle plate and adapted to extend and retract upon actuation of said lock member; and said lock bar when extended engaging a portion of a side panel of said first receptacle.

4. A safe in combination with a vehicle comprising:

a first box-like member having one open side;

said first box-like member being rigidly secured to the frame of a vehicle and positioned so that the open side is accessible to the interior of the vehicle;

a second box-like member having one open side;

said box-like members being dimensioned to permit said members to nest together thereby defining a completely enclosed cavity therein;

said second box-like member being dimensioned such that when said box-like members are nested within said vehicle the open sides of said second box-like member closely abut said frame thereby precluding the insertion of an implement between the frame and said second box-like member to prevent unauthorized removal of said second box-like member from said vehicle;

a locking mechanism operably engageable with each said box-like members to secure said members in nesting relationship; and means associated with said safe to permit the deposit of money therein when said box-like members are in nesting relationship.

5. The apparatus as defined in claim 4 wherein said second box-like member is dimensioned to overlie said first box-like member, said locking mechanism is carried by said second box-like member and adapted to operably engage a portion of said first box-like member when said box-like members are in nesting relationship.

6. The apparatus as defined in claim 5 wherein said locking mechanism comprises:

a rotatably-operable lock member;

said lock member having a toggle plate mounted thereto adapted to rotate upon actuation of said lock member;

a plurality of locking bars pivotally mounted to said toggle plate;

each said locking bar adapted to extend and retract upon actuation of said lock member; and said first box-like member including wall portions having receiving slots therein to receive said locking bars, whereby upon extension of said locking bars said bars engage said slots thereby to secure said first and second box-like members in nesting relationship.

7. A safe to provide a secure theft-proof repository for use in conjunction with a vehicle comprising:

a receptacle constructed of a heavy-gage, high strength material;

means associated with said vehicle and adapted to be rigidly secured thereto to provide a secure support for said receptacle;

said support means cooperating with said receptacle when said receptacle is secured thereto to provide a closed safe-like container defining a cavity to retain money receipts;

said receptacle when secured to said support means enclosing said support means thereby limiting access to said support means to impede and deter removal of said safe from said vehicle;

a locking mechanism operable to secure said receptacle to said support means; and means associated with said container for depositing money into said cavity.